(No Model.)
A. E. DREW.
ORANGE KNIFE.
No. 579,088. Patented Mar. 16, 1897.
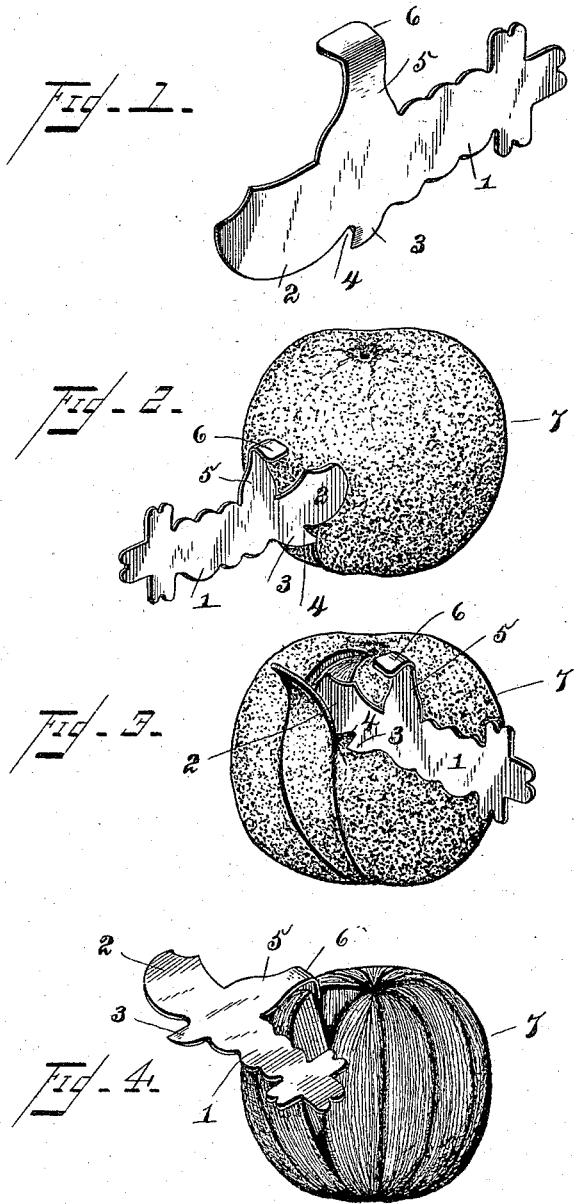
WITNESSES
Marcus D Byng
J.C. Tappan
INVENTOR
Anna E. Drew.
by John Wedderburn
Attorney

UNITED STATES PATENT OFFICE.

ANNA E. DREW, OF NEW YORK, N. Y.

ORANGE-KNIFE.

SPECIFICATION forming part of Letters Patent No. 579,088, dated March 16, 1897.

Application filed August 28, 1896. Serial No. 604,150. (No model.)

*To all whom it may concern:*

Be it known that I, ANNA E. DREW, a citizen of the United States, residing at New York, in the county of New York and State of New York, have invented certain new and useful Improvements in Orange-Knives; and I do hereby declare the following to be a full, clear, and exact description of the invention, such as will enable others skilled in the art to which it appertains to make and use the same.

My invention relates to improvements in orange-knives, the object of the same being to provide a simple and cheaply-constructed device of this character whereby the skin of the orange may be readily, quickly, and conveniently cut and removed from the orange and the orange afterward divided up into sections without danger of soiling the hands from the juice of the orange.

The device is made of a sheet of metal formed with a handle at one end, a cutting-tooth upon its under side, a forwardly-extending tongue at its front end, having a rounded lower edge which is separated from said tooth by a notch or recess and which constitutes a shoulder or fulcrum for guiding the knife in its cutting operation, and an upwardly-extending arm having a flange at its end which is adapted to be inserted into the pithy portion of the core of the orange for the purpose of separating the different sections one from the other.

The invention is clearly illustrated in the accompanying drawings, in which—

Figure 1 represents a perspective view of my improved device. Fig. 2 is a similar view of the same, showing it in the position it assumes when cutting the skin of the orange. Fig. 3 is a similar view showing it in the position it assumes when used for removing the skin. Fig. 4 is a similar view of the same, showing it in the position it assumes when used for separating the different sections of the orange.

Like reference-numerals indicate like parts in the different views.

My improved orange-knife is made of a single piece of sheet metal formed with a handle 1 at one end and with a forwardly-extending tongue 2 at the opposite end. The sheet of metal is slightly curved longitudinally, so that when used for removing the skin of the orange it will fit tightly against the outer convex surface of the orange-sections. The lower edge of the device is formed with a tooth 3, whose front edge is sharpened and separated from the tongue 2 by a notch or recess 4. The lower edge of the tongue is preferably rounded and constitutes a fulcrum or guide for the tooth 3 when the device is used for cutting the skin of the orange. Said tongue also serves the function of removing the skin of the orange when the same has been cut up into sections of any size and shape. Located at a point just opposite the cutting-tooth 3 and extending upwardly from the main body part of the device is an arm 5, having an inwardly-projecting flange 6 thereon.

In using my device the orange 7 is taken in the left hand and my improved orange-knife grasped by the right hand. The tooth 3 is then inserted through the skin of the orange, with the rounded portion of the tongue 2 resting upon the skin just in advance of said tooth. The knife is then moved forwardly, cutting the skin into halves. The same operation may be continued to cut the skin into quarters, or any other sized sections thereof may be formed. By the provision of the shoulder or rounded portion of the tongue 2 just in advance of the cutting edge of the tooth 3 I am enabled to cut any thickness of skin without danger of cutting into the orange itself. By changing the angle at which the knife is held to the outer surface of the orange the tooth 3 is capable of cutting an orange of any thickness of skin. When the skin is cut into the proper-sized sections, the forward end of the tongue 2 is inserted beneath the upper end of each section of skin and drawn downwardly, as shown in Fig. 3, completely removing the skin without danger of cutting into the orange itself. When the skin has been removed, the device is turned rearwardly, with the flange 6 fitting within the pithy portion of the core, and the sections of the fruit separated one from the other without the necessity of touching them with the fingers and thereby soiling the hands.

While I have described the cutting edge of the tooth 3 as being located adjacent to the tongue 2, it is obvious that it may be formed with a cutting edge on both sides, so that the tooth will be operative in either direction in which it may be moved. This, however, is a mere detail.

It will be observed that my device is in the general form of a dove flying, the tooth 3 representing the beak of the dove, the arm 5 the body part thereof, the flange 6 the tail, and the handle 1 and tongue 2 the two wings.

In manufacturing my device I propose to have stamped upon the outer surface of the metal the outline of a dove or other bird, which will make this resemblance more close, or any other design that may be considered appropriate.

Having now described my invention, what I claim as new, and desire to secure by Letters Patent, is—

An orange-knife made of a single piece of metal having a handle at one end, a forwardly-projecting tongue at the opposite end having a rounded lower edge constituting a shoulder or guide, a cutting-tooth upon the lower edge separated from said rounded portion or shoulder by a notch or recess, an upwardly-projecting arm located just opposite said tooth, and a flange upon the end of said arm, substantially as and for the purpose set forth.

In testimony whereof I have signed this specification in the presence of two subscribing witnesses.

ANNA E. DREW.

Witnesses:
ALFRED E. DREW,
L. M. CHAPMAN.